(12) United States Patent
Ren

(10) Patent No.: US 7,587,377 B2
(45) Date of Patent: Sep. 8, 2009

(54) METHOD OF SCORING AND AUTOMATICALLY QUALIFYING SEARCH RESULTS BASED ON A PRE-DEFINED SCORING MATRIX RELATING TO A KNOWLEDGE DOMAIN OF THIRD-PARTIES INVOKING A RULE CONSTRUCTION TOOL TO CONSTRUCT SCORING RULES TO ANSWERS FOR QUESTIONS WITHIN THE KNOWLEDGE DOMAIN

(76) Inventor: Tom Yitao Ren, 5433 Westheimer, Suite 925, Houston, TX (US) 77056

( * ) Notice: Subject to any disclaimer, the term of this patent is extended or adjusted under 35 U.S.C. 154(b) by 263 days.

(21) Appl. No.: 11/555,583

(22) Filed: Nov. 1, 2006

(65) Prior Publication Data

US 2008/0154825 A1    Jun. 26, 2008

Related U.S. Application Data

(60) Provisional application No. 60/733,871, filed on Nov. 7, 2005.

(51) Int. Cl.
*G06N 5/00*  (2006.01)
*G06N 5/02*  (2006.01)
*G06F 17/40* (2006.01)
*G06F 19/00* (2006.01)
*G06F 17/30* (2006.01)

(52) U.S. Cl. .............................. 706/45; 706/50; 706/61; 707/3

(58) Field of Classification Search .................. 706/45, 706/50, 61; 707/3
See application file for complete search history.

(56) References Cited

OTHER PUBLICATIONS

Mullei et al., Induction of Rule-based Scoring Functions, 1998.*
Chen et al., Bringing Order to the Web: Automatically Categorizing Search Results, 2000.*

* cited by examiner

*Primary Examiner*—David R Vincent
*Assistant Examiner*—Nathan H Brown, Jr.
(74) *Attorney, Agent, or Firm*—David B. Dickinson

(57) ABSTRACT

A computer driven information management system selectively ranks and qualifies third-parties, such as vendors, by utilizing user-defined and selected questions and qualification criteria from various data sources to utilize the database information available in public, commercial or in private, or by information directly supplied by the third-party in a registration with the organization desiring information from the third-party. The system displays the results of the scoring system for user selection. Alternatively, the system can automatically generate a notification of selection to the organization, the user and the third-party from whom the information was obtained.

8 Claims, 7 Drawing Sheets

METHOD OF SCORING AND AUTOMATICALLY QUALIFYING SEARCH RESULTS BASED ON A PRE-DEFINED SCORING MATRIX RELATING TO A KNOWLEDGE DOMAIN OF THIRD-PARTIES INVOKING A RULE CONSTRUCTION TOOL TO CONSTRUCT SCORING RULES TO ANSWERS FOR QUESTIONS WITHIN THE KNOWLEDGE DOMAIN

REFERENCE TO PRIOR APPLICATIONS

This application claims the priority filing date of U.S. Provisional Application Ser. No. 60/733,871, filed on Nov. 17, 2005.

TECHNICAL FIELD AND BACKGROUND OF INVENTION

This invention relates to a computer-driven and implemented information management system; and more specifically, to an information management system for selectively matching or qualifying third-party information providers within a specific knowledge domain to the preferred characteristics sought by the user using a general purpose networkable computer workstation having a central processor unit, memory, a graphics user interface and a pointer control device and input keyboard. Although this unique method can be applied to many knowledge domains, such as Human Resources including Employee Recruiting and Promotions, Procurement Opportunity Gathering, Event Scoring, Multi-source Content Searching and Ranking, and the like, the present description will be limited to vendor selection and qualification for large corporate clients having thousands of different vendors who are providing millions of dollars of goods and services to the user throughout the world.

The present invention allows a user, who may be purchasing agent in the specific example used herein, to selectively review and rank vendors interested in selling goods and services to the user's company based upon vendor input to user created questions within a specific knowledge domain or by query to existing databases of specific vendor information. Each knowledge domain would be specific to the diverse needs of the user and the vendor within the market for the vendor's product or service. For example, a large car manufacturer might seek inquiries from electrical vendors of electrical connections and suppliers of galvanized steel sheets and would be able to not only find suppliers based on information previously provided and defined rankings, but would be able to create new queries using existing criteria or pose new questions that are specific to his needs. Each supply area would provide unique and critical criteria for choice. Information critical to the selection of an electrical supply vendor would not be compatible with the information necessary to obtain from the galvanized steel supplier, although common criteria such as geographic location of the supplier and financial stability of the supplier—can often overlap.

This invention provides a method of creating and using a specific knowledge domain database to query individual vendors within a specific knowledge domain to select those who meet or exceed the criteria created by selection criteria. The query can be designed either upon submission or taken from a knowledge base database. This selection method can be implemented to acquire information and correspond to users and vendors over the internet to allow rapid response and selection when time is crucial to the selection and implementation of the selection.

SUMMARY OF THE INVENTION

A computer-driven method of scoring and automatically qualifying search results based on a predefined scoring matrix of third-parties stored in computer workstation hardware providing a memory component, a graphical user interface accessed through a keyboard, a pointing device, a monitor, communications equipment such as a modem, and at least one line of communication with all users and system components, relating to a knowledge domain contained in local, network and internet databases accomplished by delimiting specific questions within the knowledge domain databases; invoking a rule construction tool implemented in the configured computer workstation to construct scoring rules to answers of said questions within the knowledge domain databases; invoking a qualification definition tool implemented in the configured computer workstation to define a qualification level and set level standards based on answers of said questions inputted by vendor into the particularly configured workstation using the graphical user interface and application-specific entry forms on an interactive screen; storing said rules and qualification definitions as a scoring matrix in the configured computer workstation memory component; accepting search criteria and rank based on scoring matrix to query an internal, networked, or internet-based database within a knowledge domain; displaying computationally created categories that include a qualification level and ranked order by score level; and, computationally selecting a set number of third-parties above a set rank order.

The specific questions to be used can be based on third-parties registration forms inputted into the configured computer workstations and stored in a database in the configured computer workstations. Alternatively, the specific questions can be obtained from a link to one or more physically external databases, or third-party web pages with stored answers to specific questions.

The new and unique method wherein the third-parties' information is drawn, depending on user input, from a corresponding and relevant group database can similarly consist of information drawn from any one of the following: vendors, employees, convention attendees, survey participants, and consumers, without departing from the spirit or intent of this disclosure.

The third-parties can be prospectively inputted into the computer-driven information management system after initial and subsequent processes and computations.

The method of accomplishing this can provide an automatic email notification to a user or buyer, and to a selected third party upon completion of the third party registration, including inputting application into the configured computer workstation and computationally processing the data with respect to the scoring matrix stored in the configured computer workstation, within the qualification level and score.

This method of computationally scoring and automatically qualifying search results based on a pre-defined scoring matrix stored within the configured computer workstation of third-party databases relating to a knowledge domain, can also be provided by accessing specific existing data elements stored in the configured computer workstation memory unit within the knowledge domain; invoking a rule construction tool computer process to construct scoring rules to access specific existing data elements stored in the configured computer workstation memory unit within the knowledge domain; invoking a qualification definition tool computer process to computationally define a qualification level and set level standards based on a scoring rules outcome; storing said rules and qualification definitions as a scoring matrix within the configured computer workstation; accepting search criteria and rank based on application of a stored scoring matrix to a knowledge domain consisting of internal, networked, or internet-based databases for additional specific existing data elements required for processing; displaying computationally created categories that include a qualification level and ranked order by score level; and, computationally selecting from said search results a set number of third-parties above a selected rank order.

This method can further provide for data security and backup by physically storing the selected search results above a selected rank for later use.

BRIEF DESCRIPTION OF THE DRAWINGS

FIG. 2 is a screen shot of a supplier qualification search process.

DESCRIPTION OF THE INVENTION

Figure 1:
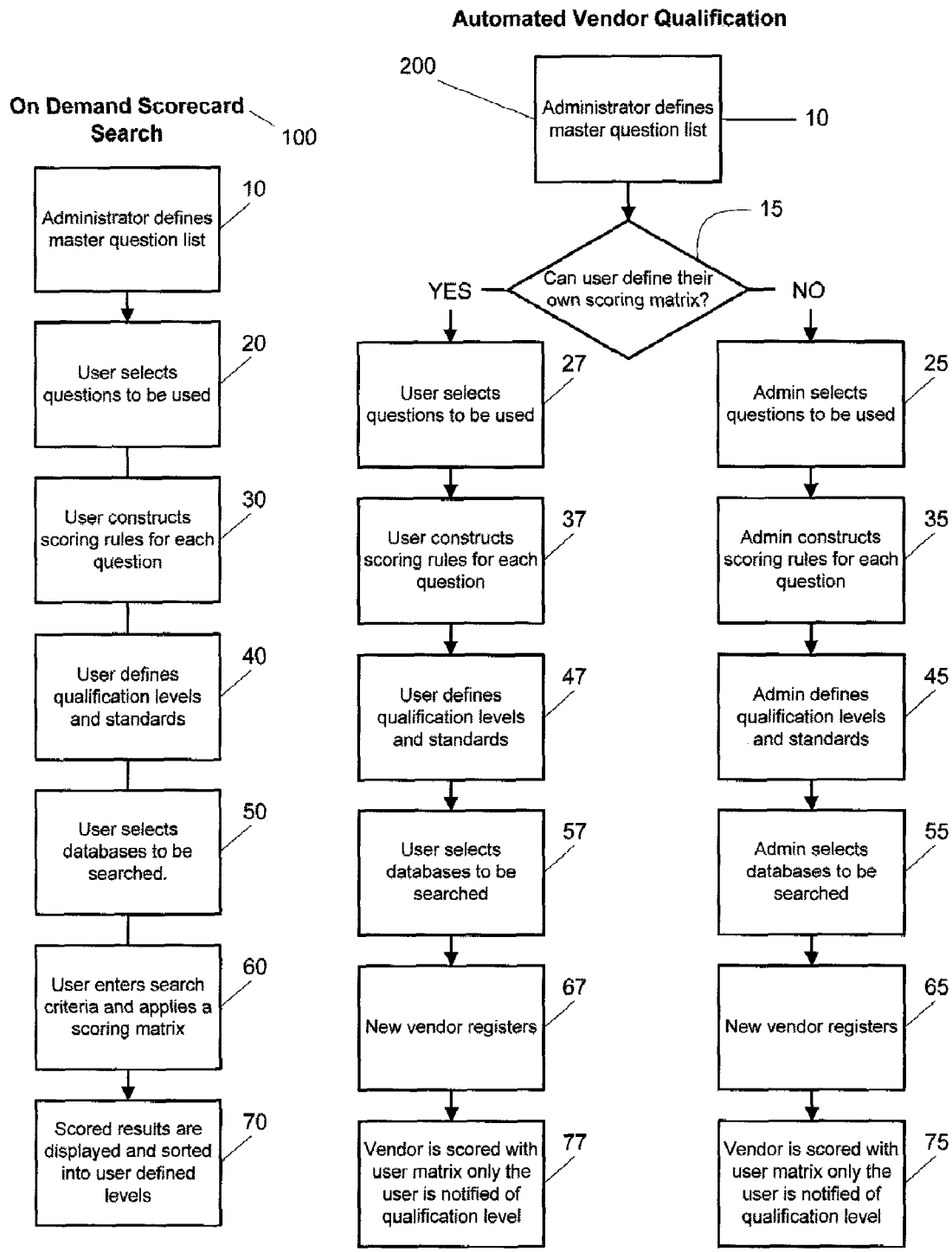
FIGS. 1A and 1B is a block diagram of the process flow of functionality of the method.

This computer based, internet ready, vendor screening system provides two major functions. Once the knowledge base for area of interest has been created by an administrator, the user can create a search and rank participants by using the on-demand user-defined scored search function of the present invention. This on-demand scored search function is more clearly shown in FIG. 1A as steps 10-70 inclusive. The second function providing an automated vendor qualification and selection process is shown in FIG. 1B as steps 10-77 inclusive. As previously noted, even though the particular embodiment shown relates to vendor qualification and search, the tools of the present invention can be applied with equal ability to other knowledge domains, such as human resources, customer surveys, consumer preference surveys, and the like without departing from the spirit or intent of this invention.

To access the system of the embodiment of the present invention, the administrator and user are required to access a computer workstation with suitable hardware and software configured to receive and distribute information through a local area network or the internet to a pre-constructed system website. The workstation would provide a graphical user interface and application-specific entry forms or interactive windows. Other required system hardware includes a keyboard, mouse or pointing device, monitor, communications equipment such as a modem, and at least one line of communication with all other users and system components. System software includes a suitable web browser, such as Microsoft's Internet Explorer, Firefox, or similar browsers, for navigating the networked components of the system. In addition, conventional client I/O tools such as HTML, XTML, JAVA, or other similar network distributable software can be used to create various functional screens for end users on a global wide-area network.

On-Demand Scored Search

An on-demand scored search function 100 of FIG. 1A can be used if the user of the service is sophisticated in the requirements and capabilities of the vendor pool from whom the selected vendor group will be drawn. As shown in FIG. 1A, to utilize the on-demand feature of the present invention, an administrator within an organization must create a master question list 10 which appropriately defines the criteria for the universe of vendors from whom the user must choose or rank selected members. The administrator defines questions 10 that commonly appear in vendor registration, qualification, or request for proposal forms and maps that database information into the question-formatting portion of the present system. Questions can be of many different types and provide various answer types. For example, a question can be a "Checkbox" type, and have "Numeric" values as opposed to a "Textbox" type with "Numeric" values or a "Radio button" type with "Text" values. This formatting flexibility permits the administrator to create a unique and comprehensive set of questions which can then be selected by the user for the search process 20.

The user can select from this predefined list a set of questions to build a scoring matrix. After the user has selected a set of questions 20, the user can construct scoring rules for each question 30. See FIGS. 3 and 4 as illustrated examples. Scoring rules are constructed dynamically, similar to building a sentence. Scoring rules can either add a value to or subtract from the total score of a vendor, or flag the vendor with an icon if a certain answer criteria is met or, alternatively, not satisfied.

Figure 2:
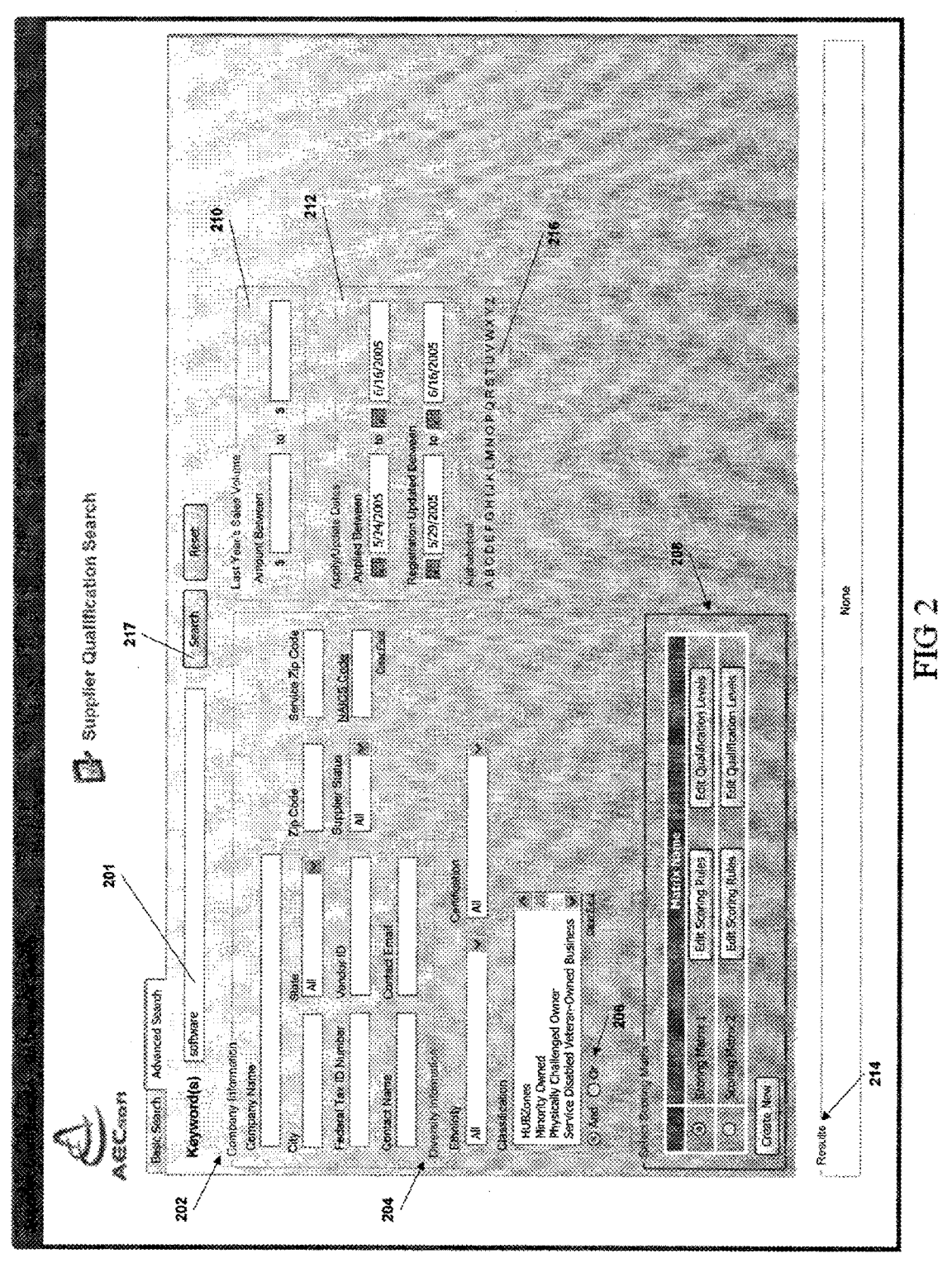

In FIG. 2, the Supplier Qualification Search screen provides the top level of the rule construction and qualification screens for both the construction and search by the user. The user selects the Supplier Qualification Search screen, FIG. 2, to obtain a desired preset or previously created matrix or to create a new matrix. The user can alternatively move directly to the Define Rules screen, FIG. 3, from a top-level directory screen (not shown). FIG. 2 is a screen shot of the Supplier Qualification Search which may be searched by any of the following fields shown, including: keyword 201, company information 202, diversity information 204, either conjunctively or disjunctively 206, ranges of sales volumes 210, and application or registration date ranges 212. Selecting an appropriate button within the box 208 can access new or existing Scoring Matrix searches. The results are shown in Results box 214. Any of the boxes can be limited to a subset based upon the selection of an alphabetic button which displays only those hits having the selected alphabetic character. For example, trying to limit the search of vendors to Houston, a user would sort the matrix under the "H" button to return only those vendors located in Houston.

Figure 3:
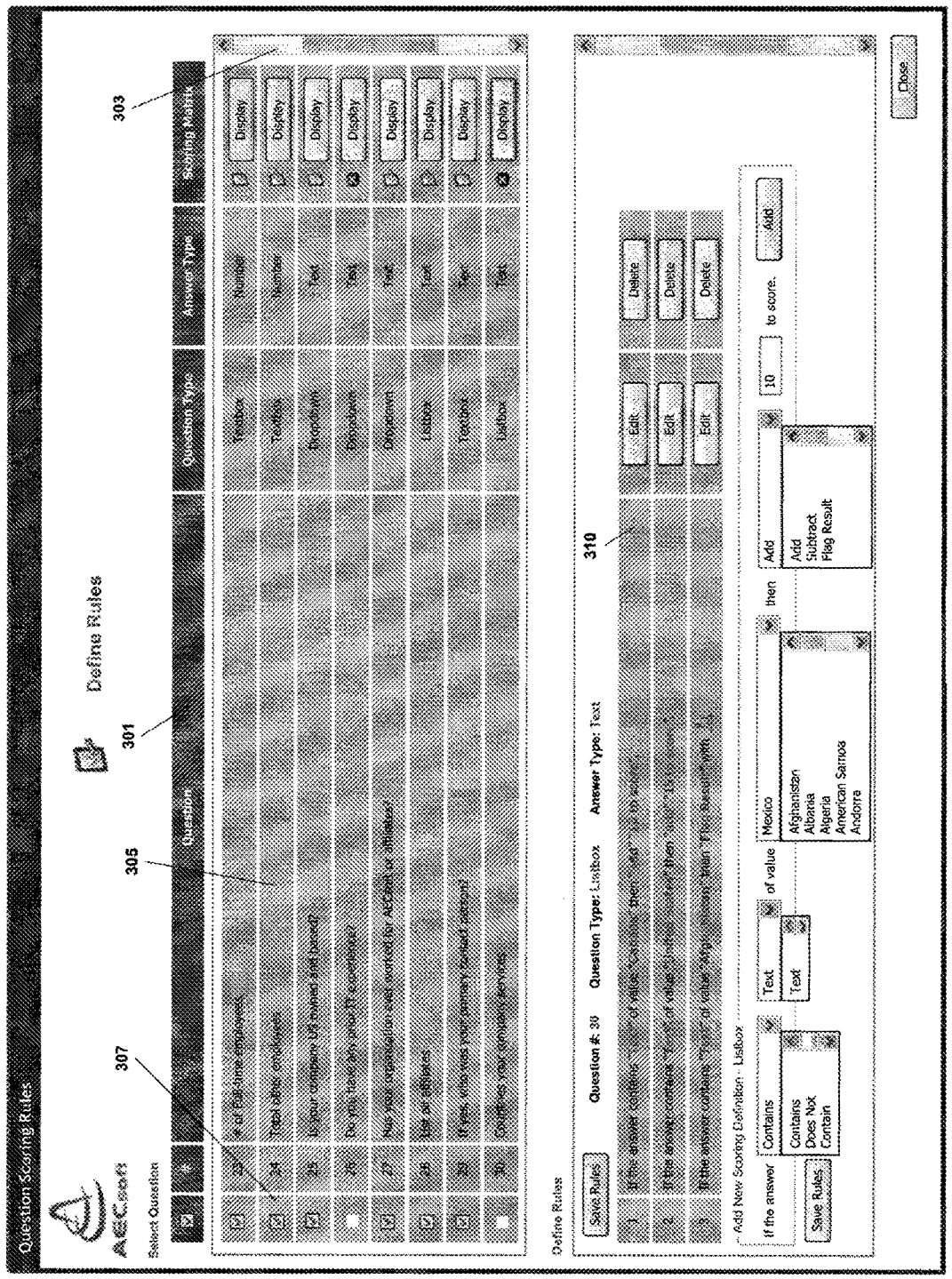
FIG. 3 is a screen shot of the rules definition step of the process.

Questions can be of many different query types and have various answer types. The question and answer form can affect the types and uses of scoring rules available to be constructed in step 20 as shown in FIG. 1 and applied to the question. The construction of these rules results from the interaction of the user as shown in FIG. 3, the Define Rules screen shot. After the administrator has created the question set 301, this screen (FIG. 3) is populated with a scrollable 303 list of questions 305 which can be selected by the user by clicking check boxes 307. For each question, the user can then define a rule 310 which contains a variety of user chosen criteria as illustrated. By saving the rule to the memory of the computer workstation, the question and rule are added with the weight chosen to the user's scoring matrix. This completes the step 30 of FIG. 1A. The user builds various associated scoring rules 30 for each question.

Figure 4:
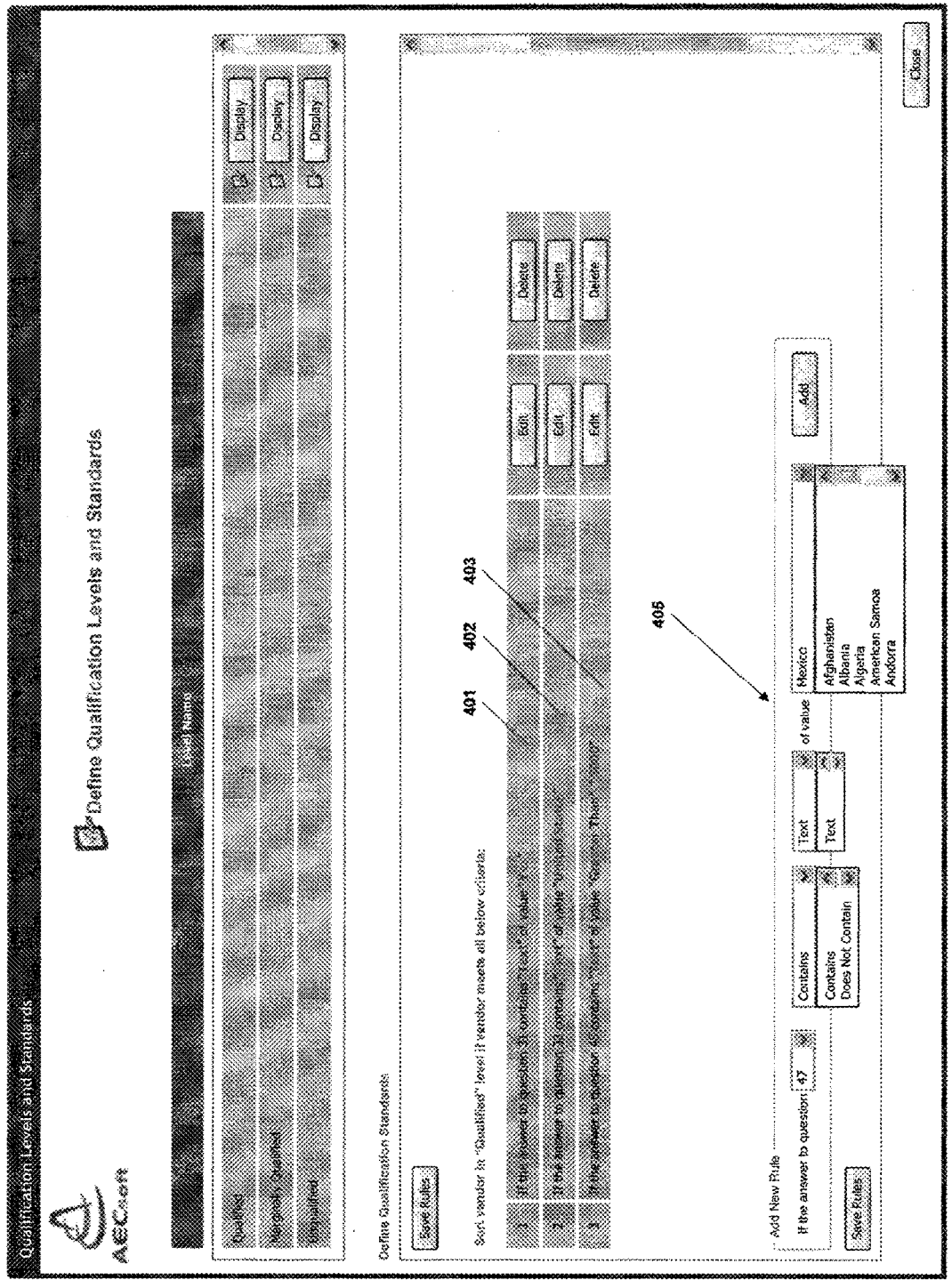
FIG. 4 is a screen shot of the qualification and standards definition step of the process.

Having created the appropriate rules, the user defines qualification levels and standards 40 of FIG. 1A to automatically sort scored vendors into each level as more fully shown in FIG. 4. For example, the user could test the qualification of the vendor by an answer of "yes" 401 to question 31, which if the response 402 was "United States" to question 32 and "Greater Than" and "5000" to question 45, as shown in line 403, would rank the vendor as qualified. Even more complex standards could be fashioned by adding additional rules in the Add New Rule box 405. The user can define the standard for each qualification level, for example, having a score between 90%-95% in addition to answering "Yes" to various critical questions will sort a new registrant into a certain level.

Figure 5:
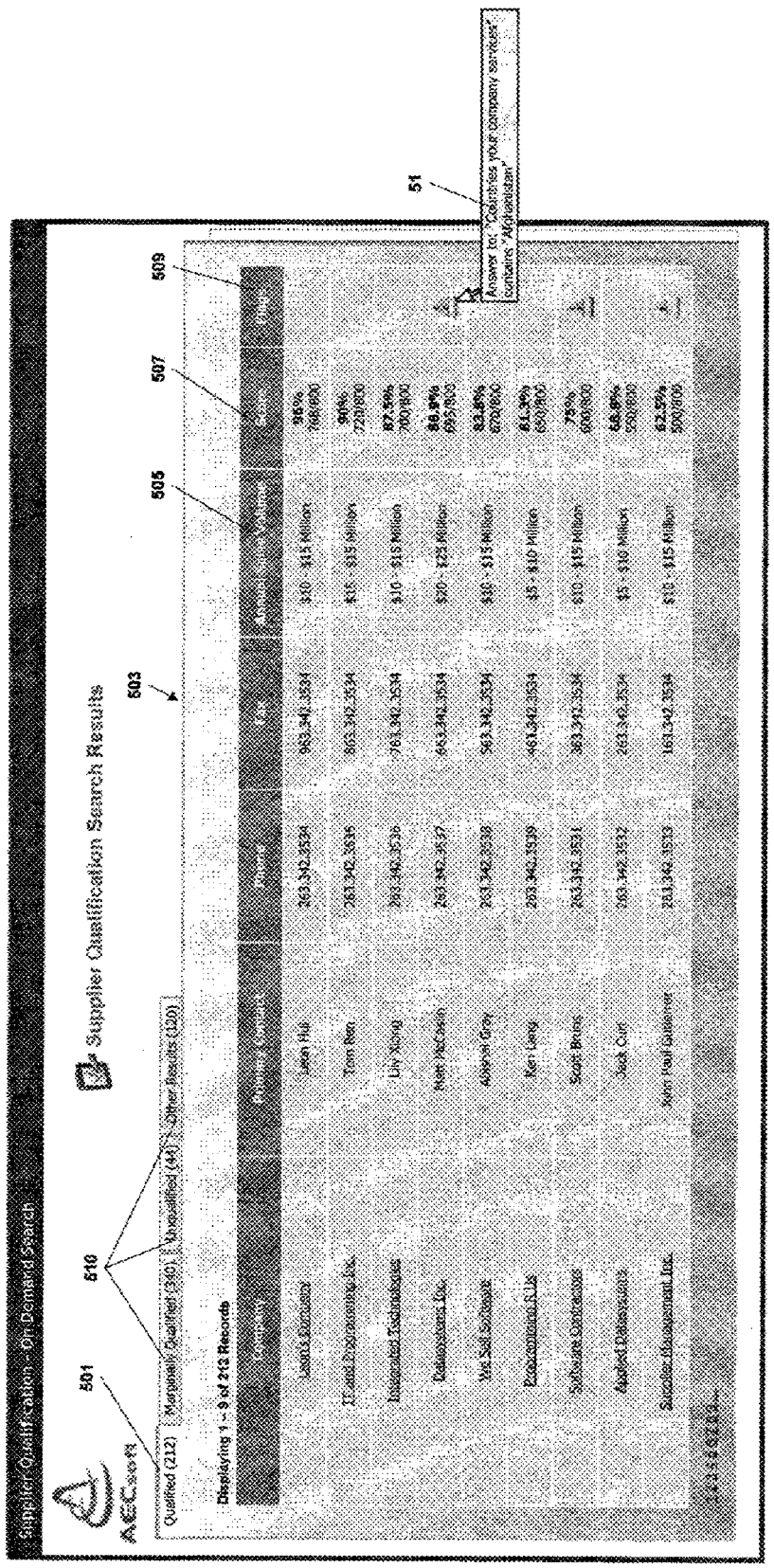
FIG. 5 is an exemplar of a screen shot of a supplier qualification search results of the process.
Figure 7:
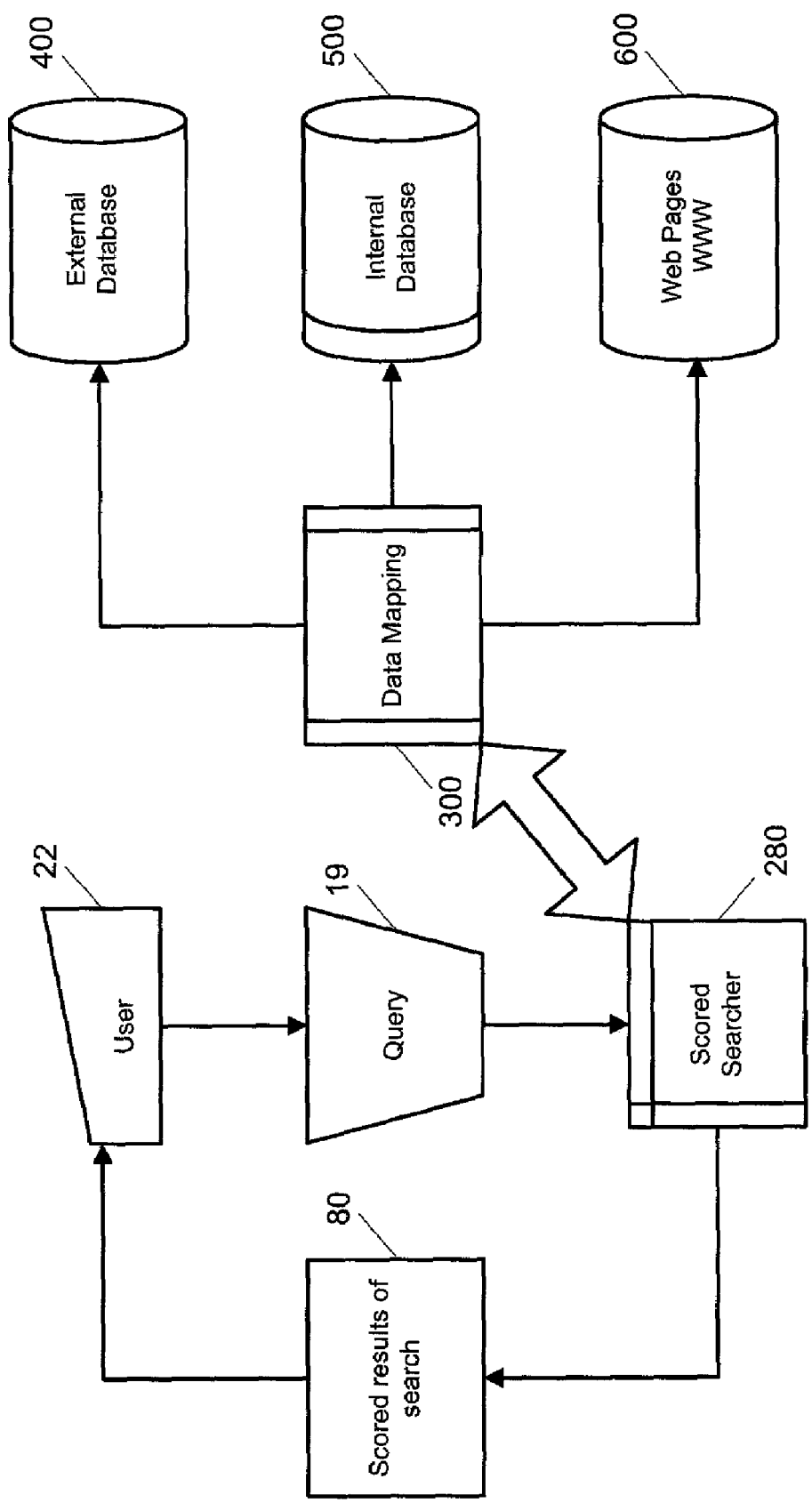
FIG. 7 is a block diagram of the process flow of the functionality of the method illustrating the multiplicity of data sources for populating the data search query.

FIG. 7 shows how the query submitted by the user 22 to the query front end 19 of the present system 280 activates the data mapping function 300 to establish a link with either external databases 400, whether one or more, internal databases 500, or web pages 600 available through the World Wide Web. The intelligent search function of the data mapping module 300 creates a pattern based upon the query or question entered by the user and automatically searches for data fields which can satisfy the user's desired questions. Once these data fields, from either the external database 400, internal database 500 or web page 600, are selected the system automatically creates a match set for the query engine and ranks the results based upon the ranking rules previously described above. The results of this ranked search are transmitted back to the user as the scored results of the search 80, which is shown in FIG. 5. In the Supplier Qualification Search Results screen qualified vendors 501 are shown. The identification and contact information 503 for each is displayed, along with pertinent search results and the score received from the user's qualification level built in FIG. 4. The flags 509 are interactively tied to the information, creating the Flag Result 51. The marginally qualified, unqualified and other results tabs 510 provide access by clicking thereon to the other lists within the search criteria as ranked by the computerized workstation. These tabs 510 also provide a count of the number of "hits" or records returned from the qualified search profile providing further feedback to the user of the resolution received from the search criteria entered in FIGS. 3 and 4. Too many hits would suggest further refinement to narrow the scope of search; too few would suggest overly aggressive qualification criteria.

The user 22 in FIG. 7 can iteratively refine his or her search pattern with the scored search results to ever more precisely define the data set and criteria desired, all in a manner well known to those using database search engines. The results of the scored search can be automatically saved permanently or temporarily, along with the data set and the specific links which created the data set, to allow the user to recreate the data search or refine it at a later time. Alternatively, the searched and ranked results can be indexed to save the key data elements permitting the removal of all other non-utilized data elements from the original data set.

As previously discussed, after completion of the rules and qualifications for a particular vendor search, the user saves the selected questions and associated scoring rules as a scoring matrix. The user next can select 50 in FIG. 1A from a list of available vendor databases to be searched. These databases may be either internal 500 in FIG. 7 or external 400 or both within the context of the search to be performed. These databases can be public, commercial or private and the web sites 600 may be accessible to the public or by password or subscription-based. The system comprised of the Scored Searcher 280 and Data Mapping 300 modules automatically creates bound lists of relevant data fields which match the context and requirements of the user's proposed search patterns as expressed in the selection of questions posed by the user. This permits the user to obtain the widest possible search in the least amount of time with the greatest chance of isolating the desired vendor or group of vendors for further investigation.

For example, the user enters search criteria such as keywords 201, city, state, zip code, etc. 202 in the screen shown in FIG. 2. Utilizing the same screen, the user selects a scoring matrix 208 to be applied to the search. The user can then save the scoring rules and qualification levels into a scoring matrix. During a search, only one scoring matrix can be applied at a time. The administrator or user begins a search by selecting which databases to search from entering the search criteria, and selecting a scoring matrix to apply. The user clicks the search button 217 of FIG. 2, and the system searches for vendors based on search criteria. The system will first return a list of suppliers that meet the search criteria. The system will then score these returned vendors according to their answers to questions on the vendor registration form selected by the user. Each rule to each question is executed. Total and percentage scores are then calculated. Associated flags are tagged onto vendors according to defined rules.

The system returns a list of scored and level-sorted vendors matching the search criteria as more fully shown in the screen shot of FIG. 5. Next, vendors are sorted into qualification levels according to the qualification level standard, the highest of which is shown at 507 of FIG. 5. If a vendor does not fit into any defined qualification level, the vendor will be placed in a general "Other Results" level accessible by clicking on tab 510. The user can also obtain lists of the marginally qualified, the unqualified, or other anomalous results through subsidiary screens by selecting tabs 510 from the result screen of FIG. 5. The user can choose to export or save the search results for later use.

The logic of this system may be used in other ways to perform automated search and notification for vendors (in the present embodiment) or other desired members of a knowledge base.

Automated Vendor Qualification

If the user needs to obtain an expedited search for an appropriate vendor, the present system can be used for an automated vendor qualification and notification. The flow of this process is more fully shown in FIG. 1B as steps 10 through 77 inclusive. The Automated Vendor Qualification begins, as did the On Demand Scorecard Search, by the creation of master questions by the administrator 10.

If the user can or desires to create the scoring matrix, he can choose to select the questions 27, the scoring rules 37, the qualification levels 47 and databases to be searched 57, all in the manner previously described. The system then automatically notifies selected vendors requesting registration with the system if they are not registered or merely notifies them of interest expressed 601 of FIG. 6. The user can choose not to have the vendor notified of interest by toggling this checkmark off. The user may also check 602 to receive notification of registration by appropriate vendors meeting the previously created criteria. The method and manner of creating these are the same as previously described and the matrix scoring system is accessed through box 603 which functions in the manner describing box 208 of FIG. 2.

The administrator who may also be the user selects from a list of administrator-defined questions 10 that appear in the organization's vendor registration form. Questions can again be of many different types and provide for various answers. Similarly, the question and answer type of the question will affect the types of scoring rules that are available to be constructed and applied to the question as was previously shown in the discussion relating to FIG. 3.

As noted above, if the organization permits the user to define their own scoring matrix 15, the user selects questions 27 to be used from the master list created by the administrator. The user can then construct the scoring rules for each question 37 in a manner similar to that described above. Having constructed a list of qualifying questions, the user can define the appropriate qualification level and standard 47 and apply a scoring matrix 57 to obtain new vendors who have registered and now qualify under the criteria selected 67. Once the vendor is scored with the user matrix selected, the user is notified of the qualified vendors for further processing and handling.

If the organization does not permit the user to define their own scoring matrix 15, the administrator selects questions to be used in the matrix 25 and then constructs scoring rules for each question 35. The administrator then defines qualification levels and standards 45 and applies the scoring matrix 55 to new vendor registrants 65. Qualifying vendors can be automatically notified 75, along with all users within the organization, of the vendor achieving this newly defined status.

Figure 6:
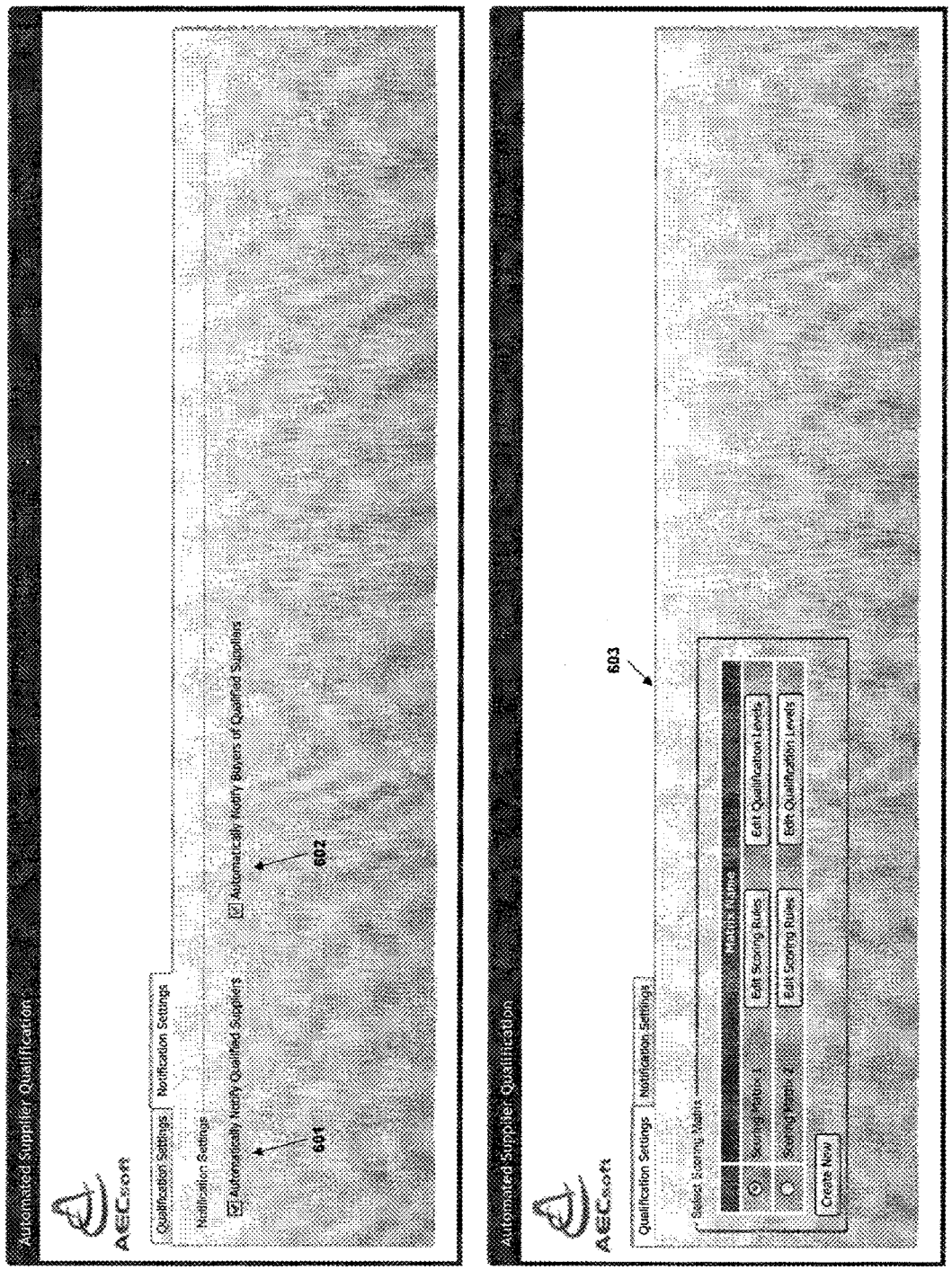
FIG. 6 is an exemplar of a screen shot of both the automated supplier qualification for both the qualification settings and the notification settings.

FIG. 6 demonstrates this automated supplier qualification of the present system, and may be reached from any of the related screens described above. FIG. 6 can be used independently or can be combined with FIG. 3—after completing the process to search and rank and identify vendors or desirable candidates, then the user can invite the selected candidates to register online to provide more information (by answering more specific questions with the corresponding Scoring Matrix). The Automated Qualification process shown in FIG. 6 will take actions to generate automated notifications to the matching users or buyers, and vendors or candidates.

Variations of this process can be implemented without substantial effort. An organization can, for example, choose to use one or both of the following two configurations concurrently.

An administrator chooses questions 10, sets up qualification levels 45, and constructs scoring rules 35 for all the users of the organization. As soon as a vendor registers via an online vendor registration form, the answers to the selected questions will be scored according to the scoring matrix, and a qualification level will be applied to the vendor. Both the vendor and users of the system will receive an online and email notification of the vendor's qualification level.

A single user chooses questions 27, sets up qualification levels 47, and constructs desired scoring rules 37. As soon as a vendor registers with the organization via an online vendor registration form, the answers to the selected questions will be automatically scored according to the scoring matrix, and a qualification level will be applied to the vendor, but specific to the user. The specific user will receive an online and email notification of the vendor's qualification level.

Organization-wide and user specific scores along with qualification levels for each new vendor registrant will be saved to the system. Organization-wide scores and qualification levels are accessible by all users. User specific scores and qualification levels are only accessible by the user.

The difference in the two functions is that the automated vendor qualification function only applies to new vendor registrants. Instead of an on-demand search of existing vendors in internal or external databases, an automatic qualification process will score and level-sort new vendor registrants.

Scoring matrices can be configured by an administrator to score and sort new vendors for an entire organization. Similarly, each user within the organization can construct unique scoring matrices. As soon as a new vendor registers, the system will qualify the vendor based on the enabled scoring matrix of the organization, and optionally the scoring matrix of each separate user of the organization.

The system will then score these newly identified vendors according to their answers to questions on the vendor registration form selected by the administrator or user. Each rule to each question is executed. Total and percentage scores can then be calculated. Associated information flags are tagged onto vendors according to defined rules. Clicking on the flag 51 brings up a pop-up box describing the contents of the flagged entry.

Next, vendors are sorted into qualification levels according to the qualification level standard. If a vendor does not fit into any defined qualification level, the vendor will be placed in a general "Other Results" level. See tabs 501 and 510.

The automated vendor qualification and notification feature is not found in the on-demand scored search function described above. New vendors and all users are notified of a vendor's qualification level and score based on an organization wide scoring matrix defined by the administrator or the user. Single users that have their own qualification matrices in place will be separately notified. The system can allow multiple e-mails, faxes, telephone call announcements, or text messages to be sent to qualifying vendors or candidates as a result of the scored ranking. A variety of differing responses may be triggered based upon scores or the results of the ranking system, all without departing from the spirit of this invention.

Numerous embodiments and alternatives thereof have been disclosed. While the above disclosure includes the best mode belief in carrying out the invention as contemplated by the inventors, not all possible alternatives have been disclosed. For that reason, the scope and limitation of the present invention is not to be restricted to the above disclosure, but is instead to be defined and construed by the appended claims.

I claim:

1. A computer-driven method of scoring and automatically qualifying search results based on a predefined scoring matrix of third-parties stored in a computer workstation hardware providing a memory component, a graphical user interface accessed through a keyboard, a pointing device, a monitor, communications equipment such as a modem, and at least one line of communication with all users and system components, relating to a knowledge domain contained in local, network and internet databases, comprising:

delimiting specific questions within the knowledge domain databases;

invoking a rule construction tool implemented in the configured computer workstation to construct scoring rules to answers of said questions within the knowledge domain databases;

invoking a qualification definition tool implemented in the configured computer workstation to define a qualification level and set level standards based on answers of said questions inputted by vendor into the particularly configured workstation using the graphical user interface and application-specific entry forms on an interactive screen;

storing said rules and qualification definitions as a scoring matrix in the configured computer workstation memory component;

accepting search criteria and rank based on the scoring matrix to query an internal, networked, or internet-based database within a knowledge domain;

computationally selecting a set number of third-parties above a set rank order; and, displaying computationally created categories that include a qualification level and ranked order by score level.

2. The method of claim 1 wherein the specific questions are based on third-parties registration forms inputted into the configured computer workstations and stored in a database in the configured computer workstations.

3. The method of claim 1 wherein the specific questions are obtained from a link to one or more physically external databases with stored answers to specific questions.

4. The method of claim 1 wherein the third-parties are drawn, depending on user input, from a corresponding and relevant group database consisting of one of the following: vendors, employees, convention attendees, survey participants, and consumers.

5. The method of claim 4 wherein the third-parties are prospective and can be inputted into the computer-driven information management system after initial and subsequent processes and computations.

6. The method of claim 1 further providing an automatic email notification to a user or buyer, and to a selected third party upon completion of the third party registration, including inputting application into the configured computer workstation and computationally processing the data with respect to the scoring matrix stored in the configured computer workstation, within the qualification level and score.

7. A method of computationally scoring and automatically qualifying search results based on a pre-defined scoring matrix stored within a configured computer workstation of third-parties databases relating to a knowledge domain, comprising:

accessing specific existing data elements stored in the configured computer workstation memory unit within the knowledge domain;

invoking a rule construction tool computer process to construct scoring rules to access specific existing data elements stored in the configured computer workstation memory unit within the knowledge domain;

invoking a qualification definition tool computer process to computationally define a qualification level and set level standards based on a scoring rules outcome;

storing said rules and qualification definitions as a scoring matrix within the configured computer workstation;

accepting search criteria and rank based on application of a stored scoring matrix to a knowledge domain consisting of internal, networked, or internet-based databases for additional specific existing data elements required for processing;

computationally selecting from said search results a set number of third-parties above a selected rank order; and, displaying computationally created categories that include a qualification level and ranked order by score level.

8. The method of claim 7 further comprising physically storing in a computer memory the selected search results above a selected rank.

* * * * *